No. 858,503. PATENTED JULY 2, 1907.
J. W. DOUGLAS.
SAW CLAMP.
APPLICATION FILED APR. 4, 1906.
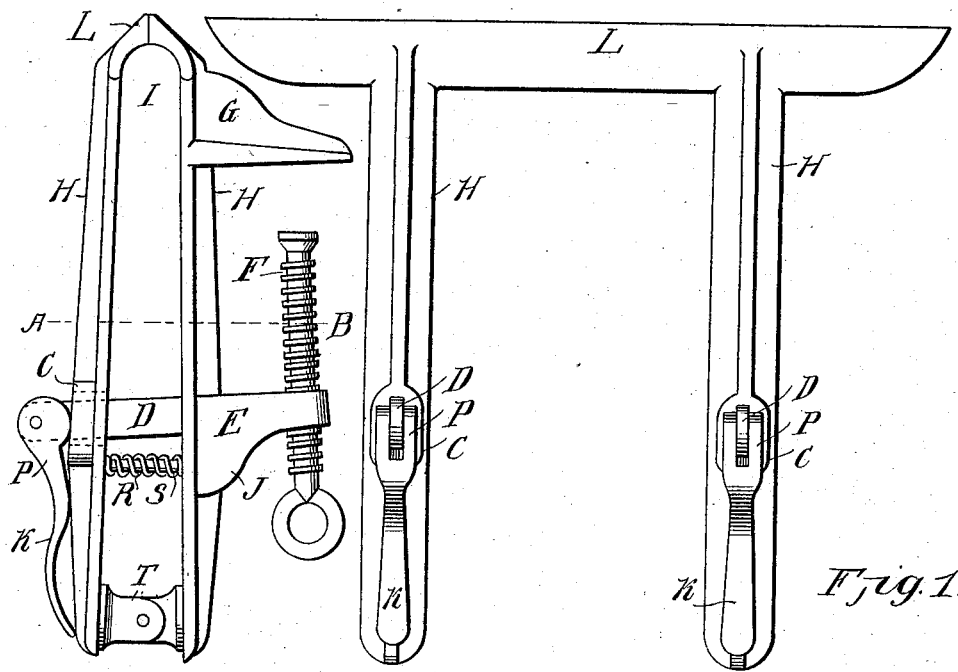
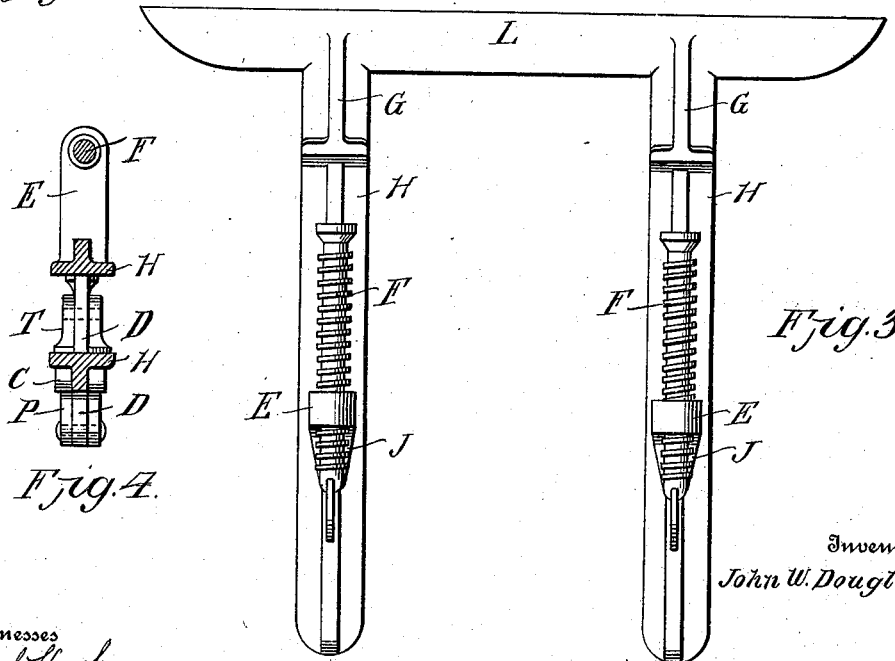
Inventor
John W. Douglas,
By Victor J. Evans
Attorney
Witnesses
Frank Hough

UNITED STATES PATENT OFFICE.

JOHN W. DOUGLAS, OF AUGUSTA, GEORGIA.

SAW-CLAMP.

No. 858,503.   Specification of Letters Patent.   Patented July 2, 1907.

Application filed April 4, 1906. Serial No. 309,785.

*To all whom it may concern:*

Be it known that I, JOHN W. DOUGLAS, a citizen of the United States, residing at Augusta, in the county of Richmond and State of Georgia, have invented certain new and useful Improvements in Saw-Clamps, of which the following is a specification.

This invention relates to saw clamps, and the object of the invention is to provide a clamp, the construction of which renders the clamp as a whole perfectly firm and steady so that when applied to a bench all vibration of the clamp and the consequent grating of the file in operating on the saw teeth is overcome.

A further object of the invention is to provide a saw clamp the construction of which renders practicable the use of extra long saw clamping jaws whereby the repeated shifting of the saw between the clamping jaws is done away with, one shifting of the saw being ordinarily sufficient.

With the above and other objects in view the nature of which will more fully appear as the description proceeds, the invention consists in the novel construction, combination and arrangement of parts as hereinafter fully described, illustrated and claimed.

In the accompanying drawings: Figure 1 is a side elevation of the improved saw clamp looking toward the outer side thereof. Fig. 2 is an end view of the same. Fig. 3 is a side elevation of the device looking toward the opposite side from Fig. 1. Fig. 4 is a horizontal section taken on the line A—B of Fig. 2.

The saw clamp contemplated in this invention comprises essentially a pair of saw clamping jaws L which it will be observed are off-set a considerable distance inward from the arms H on which the jaws are formed, thereby leaving a wide space I between the jaw carrying arms H in which the handle or head of an ordinary hand saw is adapted to be received, while the blade of the saw is clamped between the jaws L.

At their lower ends, the arms H are provided with inwardly extending and overlapping pivot lugs T which are pivotally connected together as shown in Fig. 2, thus providing for the movement of the jaws L toward and away from each other to receive and clamp the saw blade in the usual manner.

In carrying out the present invention, two sets of arms H are employed as shown in Figs. 1 and 3, the same being located any suitable distance apart and being formed integrally with the jaws L and as each of the arms at the inner side of the device is provided with means for clamping the device as a whole to a work bench, it will be apparent that the saw clamping jaws L may be made of unusual length so that a very considerable portion of the saw blade may be held firmly thereby. The use of unusually long clamping jaws is also rendered practicable by reason of the construction, arrangement and location of the upper fixed jaws of the bench clamp, and it will be observed that the said upper bench jaws shown at G are located very close to the inner saw clamping jaw L. The jaws G are formed integrally with the inner arms H, and it will be observed that the whole upper portion of the inner member of the saw clamp is in the form of a rigid elbow having four arms, the arms G forming the bench jaws and the arms L forming the saw clamping jaws. Thus the inner saw clamping jaw L and the two fixed bench jaws G are solid or rigid relatively to each other, so that vibration is overcome and the saw blade is clamped against a practicably solid and immovable abutment consisting of the inner saw clamping jaw L and the upper bench engaging fixed jaws G.

Extending through openings in the arms H at a suitable distance below the jaw G is a connecting bar D, the same fitting tightly in an opening in one of the inner arms H and being provided behind the arm H with a bracket E provided in its outer end with a threaded opening to receive a screw F which forms the movable jaw or element of the bench clamp, the screw F being provided with the usual head adapted to engage under the work bench to hold the saw clamp firmly thereon. The screw F is provided with the usual thumb piece at its lower end. The bracket E is provided with a downwardly extending brace or elbow J which extends a considerable distance below the plane of the connecting bar D and bears against the rear face of the inner arm H so as to withstand the strain brought on the bracket E by turning the screw F up tightly against the bottom of the work bench.

The front arm H is slotted where the connecting bar D passes therethrough in order to provide for the necessary pivotal movement of the said outer arm and mounted upon the forward end of the connecting bar D is a cam lever K the head or eccentric portion P of which is bifurcated to receive the extremity of the bar D and is pivotally connected thereto as shown at C, the pivot C extending transversely of the bar D and the cam face of the head P working against the adjacent outer face of the arm H.

It will be understood that the cam lever arrangement above described is used in connection with both sets of arms H as shown in Fig. 1, thus providing for a quick adjustment of the saw clamping jaws at two different points in the length thereof, whereby the saw blade is firmly held during the sharpening and swaging process. Springs S are interposed between the outer and inner arms H for spreading the jaws L apart when released by the cam levers K, said springs being retained in position by pins R which they encircle.

I claim:

The herein described saw clamp comprising the saw clamping jaws, relatively movable arms pivotally connected together and carrying said jaws, a bench jaw integrally formed with one of said arms, a connecting bar passing through said arms, a bracket on one end of said connecting bar, said bracket provided with a brace which bears against said arms, a clamping screw carried by said bracket and forming the opposing bench jaw, and a cam lever pivoted on the opposite end of the connecting bar and adapted to engage one of the arms of the clamp for closing the same, and a spring for opening said jaw.

In testimony whereof I affix my signature in presence of two witnesses.

JOHN W. DOUGLAS.

Witnesses:
 JOHN T. MORRIS,
 LOUIS P. SPETH.